United States Patent [19]

Soeda et al.

[11] 4,246,521
[45] Jan. 20, 1981

[54] DC MOTOR SPEED CONTROL SYSTEM

[75] Inventors: Katsuji Soeda; Mitsuhiro Oyama; Fumio Sakuma, all of Sukagawa, Japan

[73] Assignee: Yamamoto Electric Industrial Co., Ltd., Fukushima, Japan

[21] Appl. No.: 22,314

[22] Filed: Mar. 20, 1979

[30] Foreign Application Priority Data

Apr. 28, 1978 [JP] Japan .................................. 53-51927

[51] Int. Cl.³ ............................................. H02P 5/16
[52] U.S. Cl. ............................. 318/331; 318/345 CA; 318/345 G
[58] Field of Search ............ 318/345 CA, 331, 345 C, 318/345 G, 459

[56] References Cited

U.S. PATENT DOCUMENTS

| 3,177,417 | 4/1965 | Wright | 318/345 CA |
|-----------|--------|--------|------------|
| 3,177,418 | 4/1965 | Meng | 318/345 CA |
| 3,327,195 | 6/1967 | Mason | 318/345 CA |
| 3,373,331 | 3/1968 | Dow | 318/345 CA |
| 3,737,748 | 6/1973 | Teoers | 318/345 CA |

Primary Examiner—David Smith, Jr.
Attorney, Agent, or Firm—Armstrong, Nikaido, Marmelstein & Kubovcik

[57] ABSTRACT

There is provided a DC motor speed control system comprising a main motor circuit which supplies a motor current from an AC source through a full-wave rectifying circuit and a semiconductor element having a control electrode to a DC motor, a manually variable voltage setting means which is connected with the full-wave rectifying circuit, a charging circuit which is connected with the manually variable voltage setting means, a switching element having a control element which is connected with the charging circuit and, when the charged voltage in the charging circuit reaches a predetermined value, is made conductive to discharge the charging circuit thereby to supply a discharge current to the semiconductor element as a triggen current, a constant voltage element which is connected with the full-wave rectifying circuit, and a detecting means which detects the counter electromotive force induced in the motor. The constant voltage element and the detecting means are connected in series to form a series circuit the terminal voltage of which is applied to the control electrode of the switching element, and the predetermined voltage value for conduction of the switching element being variable in response to the counter electromotive force so as to delay the conduction angle of the semiconductor element for the increased counter electromotive force while to advance the conduction angle of the semiconductor element for the decreased counter electromotive force.

5 Claims, 3 Drawing Figures

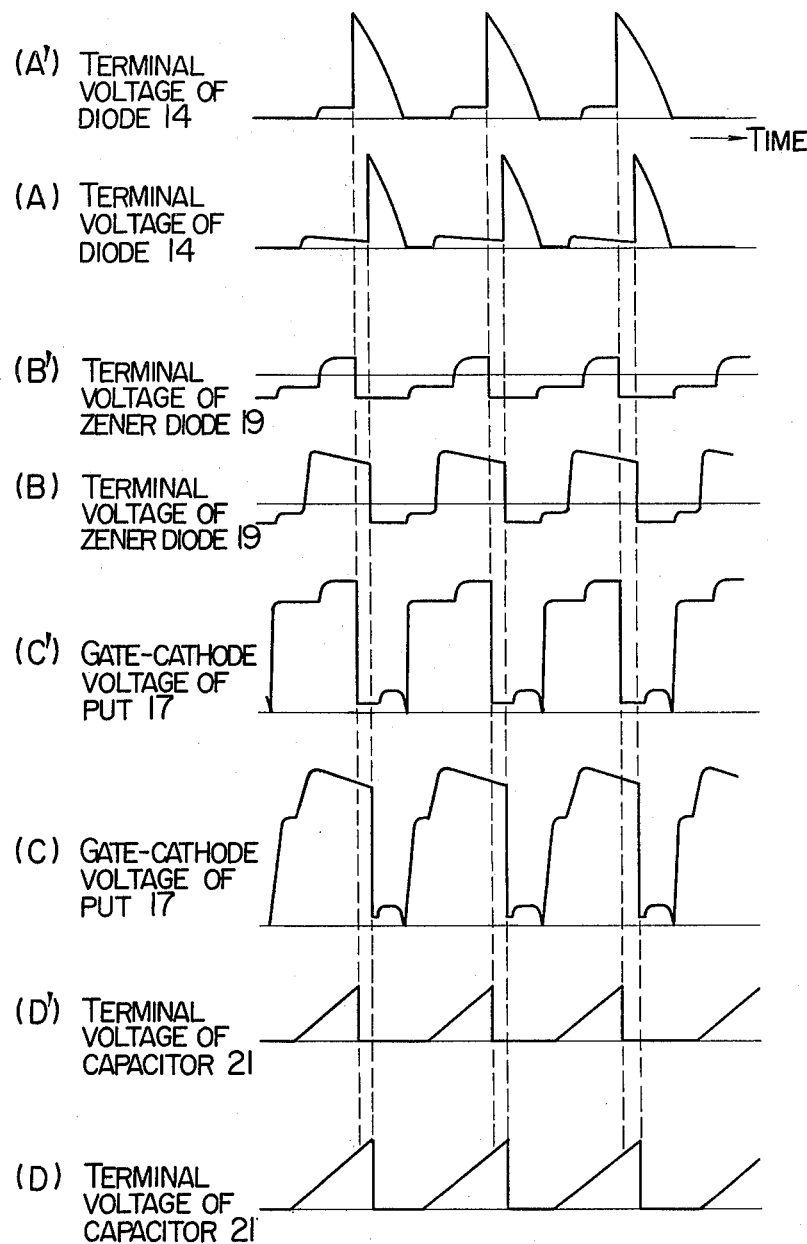

DC MOTOR SPEED CONTROL SYSTEM

BACKGROUND OF THE INVENTION

This invention relates to a DC motor speed control system and, in particular, to an improved speed control system which is little susceptible to influence from load fluctuation.

Heretofore, there have been provided motor speed control systems adapted to supply a full-wave rectified current through a semiconductor element with a control electrode to the motor, one of which control systems comprising a charging circuit which is connected through a variable current setting means to a full-wave rectifying circuit, a switching circuit which is connected with the charging circuit and, when the charging voltage in the charging circuit reaches a predetermined value, is made conductive to discharge the charging circuit thereby to supply the discharge current to the semiconductor element as a trigger current, and a detecting means for detecting the counter electromotive force induced in the motor, whereby the conduction phase of the semiconductor element is controlled in response to the detected counter electromotive force so as to stabilize the rotation speed of the motor in spite of load fluctuation. A typical example of a speed control system of this kind has been disclosed in U.S. Patent Application Ser. No. 811,625, now U.S. Pat. No. 4,168,455 entitled "Motor Speed Control System" by Katsuji Soeda et al, filed June 30, 1977, and assigned to the common assignee with the present applicant.

In this system, an automatically variable resistor means, such as a transistor, which is connected with the counter electromotive force detecting means is further provided so that the detected counter electromotive force is supplied as a bias voltage to the transistor whereby the charging current to the charging circuit is shunted by means of the transistor. Thus, the counter electromotive force is converted to the conduction current of the transistor so as to control the charging rate of the charging circuit in dependence on the counter electromotive force, whereby the conduction phase of the switching element or Diac is controlled in response to the counter electromotive force.

However, this system requires the automatically variable resistor means converting the counter electromotive force to the current, thus causing the construction to be complicated.

SUMMARY OF THE INVENTION

An object of this invention is to provide a DC motor speed control system which can eliminate the above-mentioned disadvantage.

A feature of this invention is that a new type of switching element with a control electrode is employed which has a breakdown or turnover voltage variable in dependence on the voltage applied to the control electrode and the counter electromotive force of the motor is directly applied to the control electrode whereby the conduction phase of the switching element with the control electrode can be controlled in response to the counter electromotive force.

The above and other objects, features and advantages of this invention will be made clear from the following description with reference to the accompanying drawings.

BRIEF DESCRIPTION OF THE DRAWINGS

FIGS. 2 and 3 are waveform diagrams in some elements of the circuit shown in FIG. 1 for illustrating its operation.

DESCRIPTION OF THE PREFERRED EMBODIMENT

Figure 1:
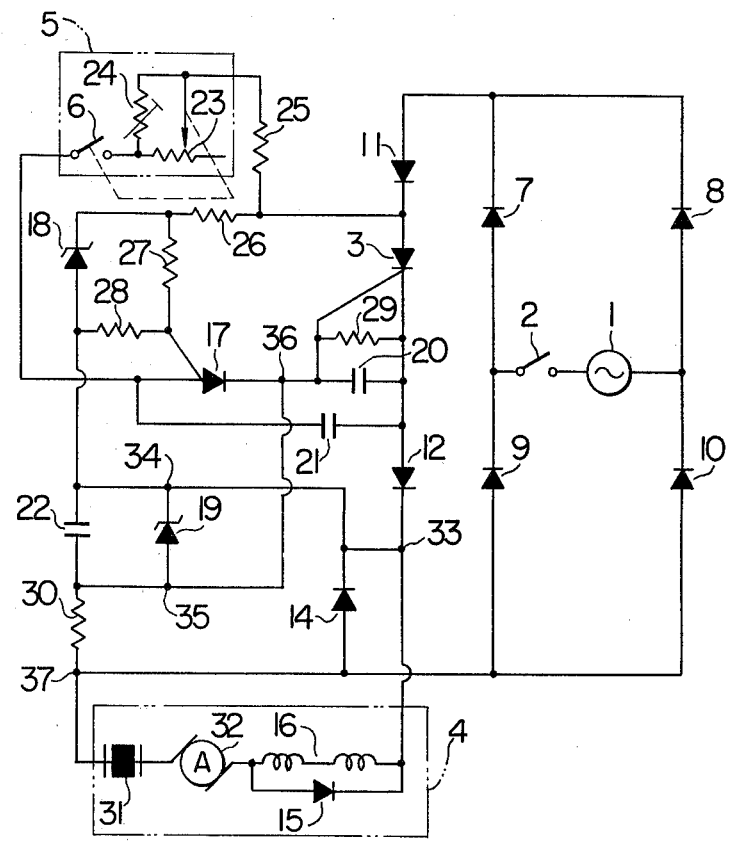
FIG. 1 is a circuit diagram of an embodiment of a DC motor speed control system according to this invention.

FIG. 1 is a circuit diagram of a typical embodiment of a motor speed control system according to this invention. Numeral 1 designates an AC source, numeral 2 a main switch which is connected with the AC source for connecting the AC source with the control system, numeral 3 a semiconductor element having a control electrode, such as a thyristor, whose anode is connected through a diode 11 to a full-wave rectifying circuit comprising diodes 7, 8, 9 and 10, numeral 4 a DC motor which is connected through a diode 12 to the cathode of the thyristor 3. The DC motor 4 may be, for example, a DC series motor which has a fly-wheel diode 15 connected in parallel with the field winding 16 and a thermal protector 31 connected in series with an armature 32. The thermal protector 31 has a switch which is connected in series with the armature and is adapted to be opened and closed in dependence on the temperature of the motor and makes the switch be opened for the temperatures below a predetermined value to permit the motor current to be supplied while making the switch closed for the temperatures above the predetermined value to shut off motor current, thereby to prevent the motor from overload operation. Numeral 5 designates a motor speed controller which is connected, on one side, through a resistor 25 and a diode 11 to the full-wave rectifying circuit and, on the other side, with a capacitor 21 and which comprises a variable resistor 23, a semi-fixed resistor 24, both of them being connected in series, and a switch 6 such as a microswitch being connected in series with the former two. The switch 6 is interlocked with the slider of the variable resistor 23 so as to be opened for the maximum value of the variable resistor 23 while to be closed for values smaller than the maximum. A switching element 17 having a control electrode such as a programmable unijunction transistor (hereinafter simply referred to as PUT) which supplies a trigger signal to the gate of the thyristor 3 is connected at its anode with the junction point of the controller 5 and the capacitor 21. The PUT 17 is made to be conductive when the charged voltage across the capacitor 21 reaches the breakdown or turn-over voltage of the PUT so that the charges in the capacitor 21 are discharged as a trigger current through the anode and the cathode of the PUT to the gate of the thyristor 3 for conduction. The variable resistor 23 controls by varying its value the charging current of the capacitor 21 thereby to control the phase in which the charged voltage across the capacitor 21 reaches the breakdown or turnover voltage of the PUT, that is, the conduction phase of the PUT and, accordingly, the conduction phase of the thyristor 3, thus causing the motor speed to be controlled continuously. The value of the semi-fixed resistor 24 is adjusted so that, when the value of the variable resistor 23 is maximum, the maximum charged voltage across the capacitor 21 may be a value slightly less than the breakdown voltage of the PUT. The diode 11 serves to prevent the thyristor 3 from malfunction due to noise, and a diode 12 serves not only to prevent together with the diode 11 the thyristor 3 from malfunction due to noise but also to prevent the capacitor 21 from being discharged through a path comprising the PUT 17, a Zener diode 19 and the diode 12 thus causing the charging current to be effectively supplied through the PUT to the gate of the thyristor 3. Numeral 14 designates a diode which is connected across the terminals of the motor in parallel therewith and serves to prevent the flash voltage generated between the terminals of the motor from being applied through a resistor 30 and connecting points 35 and 36 to the gate of the thyristor 3. Numeral 18 designates a constant voltage element such as a Zener diode which is connected, on its cathode side, through the resistor 26 to the cathode of the diode 11 and, on its anode side, through the constant voltage element such as a Zener diode 19 to the cathode of the PUT 17. A series circuit comprising resistors 27 and 28 is connected in parallel with the Zener diode 18 and their junction point is connected with the gate of the PUT 17 so that the terminal voltage of the Zener diode 18 is divided to be applied to the gate of the PUT. The resistor 25 is a protective resistor for adjusting the charging current to the capacitor 21 at a suitable level, and the resistor 26 is a protective resistor for adjusting the current flowing through the Zener diode 18 at a suitable level. The cathode of the Zener diode 19 is connected with the anode of the Zener diode 18 and one terminal 33 of the motor 4, while the anode of the Zener diode 19 is connected not only through the junction points 35 and 36 to the cathode of the PUT 17 but also through the resistor 30 to the other terminal 37 of the motor 4. Thus, the Zener diode 19 detects the rotational electromotive force to be supplied across the gate and the cathode of the PUT. The resistor 30 is a protective resistor for preventing any excessive current from flowing through the Zener diode 19. A parallel circuit comprising a resistor 29 and a capacitor 20 is connected in parallel across the gate and the cathode of the thyristor 3 and serves to prevent the thyristor 3 from malfunction due to noise. A capacitor 22 is a smoothing capacitor which is connected in parallel with the Zener diode 19 and serves to eliminate the noise included in the rotational electromotive force detected by the Zener diode 19.

Next, the operation of the circuit shown in FIG. 1 will be described. When the value of the variable resistor 23 is set to be maximum and the main switch 2 is closed with the microswitch 6 kept open, the source current is full-wave rectified through the rectifying diodes 7, 8, 9 and 10 to be supplied through the diode 11, the resistor 26, the Zener diode 18, the connecting points 34 and 33, and the motor 4 to the anodes of the diodes 9 and 10. In this case, the motor current flowing through the motor is small and thus the motor 4 is not started. On the other hand, the terminal voltage of the Zener diode 18, that is, a trapezoidal voltage of a constant maximum is voltage-divided through the resistors 27 and 28 and the divided voltage across the resistor 28 is applied through the Zener diode 19 across the gate and the cathode of the PUT 17. However, since the microswitch 6 is kept open, a circuit comprising the resistor 25, the variable resistor 23, the semi-fixed resistor 24, a switch 6 and the capacitor 21 is not supplied with current and the capacitor 21 is not charged. Accordingly, the PUT 17 is not applied with voltage at its anode and is not made conductive thus causing the thyristor 3 to be kept at the cut-off state.

Figure 2:
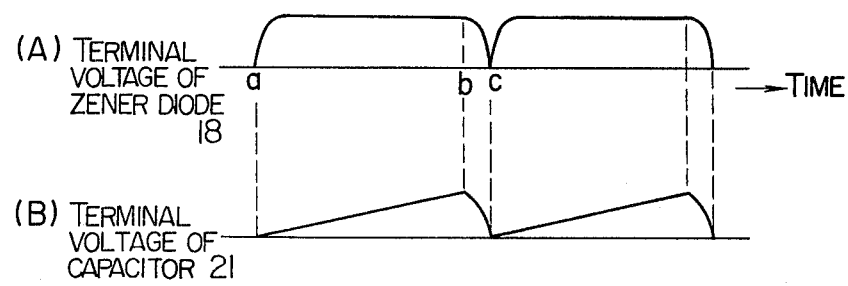

Next, when the value of the variable resistor 23 in the controller is slightly reduced from the maximum value, the microswitch 6 is closed to cause the capacitor 21 to be charged. However, since the value of the semi-fixed resistor 24 is so adjusted that the maximum charged voltage of the capacitor 21 is slightly less than the breakdown voltage of the PUT 17, the PUT 17 is not made to be conductive and the thyristor 3 is kept at the cut-off state. Now, the PUT 17 will be described with respect to its characteristics. The breakdown or turnover voltage of the PUT 17 has the characteristics that it varies depending on the gate voltage, in particular, it increases and decreases depending on the increase and decrease of the gate voltage, respectively. Under the above-described condition that the value of the variable resistor 23 is large, the terminal voltage of the Zener diode 18 show a trapezoidal shape having a constant maximum for every half-cycle of the power source as shown in FIG. 2 (A), and the capacitor 21 is charged during the period a to b so that its terminal voltage increases with a constant rate as shown in FIG. 2 (B). As the terminal voltage of the Zener diode 18 rapidly decreases during the period b to c in FIG. 2 (A), the gate voltage of the PUT 17 is also decreased so that the PUT 17 is made conductive between its anode and cathode during the period b to c. Thus, the capacitor 21 which has been charged as shown in FIG. 2 (B) is discharged to cause its terminal voltage to be decreased to zero. Then, though the discharging current from the capacitor 21 flows through the PUT 17 and the gate and cathode of the thyristor 3; since the value of the resistor 23 is large and the capacitor 21 is little charged, the current is never sufficient to cause the thyristor 3 to be triggered. Further, the discharging current from the capacitor 21 never flows, due to the presence of the diode 12, through the circuit formed of the controller 5, the resistors 25 and 26, the Zener diode 18 and the diode 12. Thus, since, as described above, the capacitor 21 is always discharged for every half-cycle, no residual charge is stored for every half-cycle and therefore the thyristor is prevented from being intermittently and unnecessarily triggered due to the stored charges.

When the value of the variable resistor 23 is further decreased to a predetermined one, the capacitor 21 is supplied with an increased current and accordingly has a charged voltage waveform of steeper gradient, so that the charged voltage reaches, only in the vicinity of its maximum value, the breakdown or turnover voltage of the PUT 17 to cause the PUT 17 to be made conductive. Thus, the capacitor 21 is discharged through the anode and cathode of the PUT 17 to supply a trigger current to the gate of the thyristor 3 and this discharging current has a value sufficient to trigger the thyristor 3, which is made conductive for a short period of time to supply a pulsating current to the motor 4 thereby to start the motor for low speed rotation.

When the value of the variable resistor 23 is still further decreased, the capacitor 21 is supplied with a further increased current so that the charged volgate of the capacitor 21 reaches the breakdown or turnover voltage with an advanced phase, that is, the firing angle of the thyristor 3 is advanced and the conduction period is prolonged, thus causing the motor 23 to increase its rotational speed.

In this manner, by adjusting the value of the variable resistor 23, the rotational speed of the motor 23 can be controlled continuously from lower speed to higher speed.

Next, the feedback action caused by the counter electromotive force in the motor will be described. The breakdown voltage of the PUT 17 is, as described above, varied in dependence on the gate voltage, in particular, the breakdown voltage is increased and decreased for the increased and decreased gate voltage, respectively. In this invention, this action of the PUT is utilized to control the motor speed in a feedback manner.

Since the counter electromotive force generated in the motor 4 during its running is applied through the connecting point 33 to the series circuit consisting of the Zener diode 19 and the resistor 30, the counter electromotive force is detected by the Zener diode 19. Then the Zener diode 19 is connected to detect not the voltage caused by the conduction current through the thyristor 3 being in the conductive state but only the counter electromotive force. Namely, the conduction current through the thyristor 3 being in the conductive state flows not only through the diode 12 to the motor 4 but also through the diode 12, the cathode and anode of the Zener diode 19 and the resistor 30, the Zener diode 19 has a voltage generated at its cathode 34. On the other hand, since the conduction current through the thyristor 3 flows through the resistor 29, the connecting points 36 and 35 and the resistor 30, the Zener diode 19 is supplied at its anode 35 with a voltage divided through the resistors 30 and 29. Then, since the value of the resistor 29 is adjusted to be a suitable one which is very small as compared with that of the resistor 30, the values of electric potantial at the anode 35 and at the cathode 34 of the Zener diode 19, which are generated by the conduction current through the thyristor 3 are equal. Accordingly, the voltage across the anode and cathode of the Zener diode 19 is caused not by the conduction current through the thyristor 3 but only by the counter electromotive force in the motor. The counter electromotive force which is thus detected by the Zener diode 19 is applied, together with a voltage divided through the resistors 27 and 28 from the terminal voltage of the Zener diode 18, through the resistor 28 across the gate and cathode of the PUT 17. Thus, the PUT 17 is controlled by the sum of the voltage divided from the terminal voltage of the Zener diode 18 and the counter electromotive force. On the other hand, since the terminal voltage of the Zener diode 18 is kept constant while that of the Zener diode 19 is varied depending on load fluctuation or the like, the breakdown voltage of the PUT 17 is varied depending on the variation in the terminal voltage of the Zener diode. Now, the feedback action will be described with reference to FIG. 3. FIG. 3 shows voltage waveforms in some elements under both the conditions of ordinary and overload running, in which, (A) and (A') are the terminal voltage waveforms of the diode 14 or the conduction voltage waveform of the thyristor 3, (B) and (B') the terminal voltage waveforms of the Zener diode 19, (C) and (C') the gate-cathode voltage waveforms of the PUT 17, and (D) and (D') the charged voltage waveforms of the capacitor 21; and (A), (B), (C) and (D) shows the waveforms under the ordinary running condition, while (A'), (B'), (C') and (D') shows those under the overload running condition. In each drawing, the abscisa and ordinate means the time and voltage, respectively. As is evident from FIGS. 3 (B) and 3 (B'), only the counter electromotive force is generated as the terminal voltage of the Zener diode 19 and, as shown in (B') the counter electromotive force is decreased for an increased load. As shown in (C) and (C'), the voltage across the gate and cathode of the PUT 17 is the superposition of the terminal voltage of the Zener diode 18 and the counter electromotive force. Further, as shown in (A), (A'), (D) and (D'), since the breakdown voltage of the PUT 17 is lowered in the overload condition, the PUT 17 is made conductive at an advanced phase, thus causing the thyristor 3 to have also an advanced conduction angle.

Thus, when the load of the motor 32 is increased to decrease its rotational speed, the terminal voltage of the Zener diode 19 is decreased to lower the breakdown voltage of the PUT 17 and, as a result, the conduction phase of the thyristor 3 is advanced, thus causing the motor to increase its rotational speed. On the other hand, when the load of the motor is decreased to increase its rotational speed, the counter electromotive force is increased to elevate the terminal voltage of the Zener diode and, as a result, the breakdown voltage of the PUT 17 is increased and the conduction phase of the thyristor 3 is delayed, thus causing the motor to decrease its rotational speed. Since the terminal voltage of the Zener diode 19 can not be increased above the Zener voltage, the increase in the gate-cathode voltage of the PUT 17 is limited to a definite value even if the rotational speed is increased and the counter electromotive force is also increased above the Zener voltage. Accordingly, although the feedback action is effective mainly for low speed operation; in the case of high speed operation in which the feedback action is not so required, the terminal voltage of the Zener diode 19 is limited below the Zener voltage and, as a result, the feedback action is adapted not to be so effective. Thus, by making the feedback action strongly effective for low speed operation, it is possible to prevent, in the case of low speed operation, the fluctuation of rotational speed caused by load fluctuation and to achieve stable running. Therefore, this invention is most suitable for a speed control system for a sewing machine or the like in which, in the case of starting and low speed running, the load fluctuation is large and strong torque is required.

Further, because of the constitution in which the PUT 17 is used as a switching element for triggering the thyristor 3, and the Zener diode 19 is supplied only with the counter electromotive force in the motor irrespective of the voltage drop caused by the conduction current through the thyristor 3, it becomes possible to connect the Zener diode 19 directly across the gate and cathode of the PUT 17 and, as a result, to provide the feedback action through the counter electromotive force in a very simple carcuit constitution.

We claim:

1. A DC motor speed control system comprising;
   a main motor circuit which supplies a motor current from an AC source through a full-wave rectifying circuit and a semiconductor element having a control electrode, to a DC motor;
   a manually variable voltage setting means connected with the full-wave rectifying circuit;
   a charging circuit connected with the manually variable voltage setting means;
   a switching element having an anode, a cathode and a control electrode connected with the charging circuit, such that when the charged voltage in the charging circuit reaches a predetermined value, the switching element conducts to discharge the charging circuit thereby to supply the discharge current to the semiconductor element as a trigger current;

a first constant voltage element connected with the full-wave rectifying circuit; and a detecting means for detecting the counter electromotive force induced across said motor;

said first constant voltage element and said counter electromotive detecting means being connected in series to form a series circuit, the terminal voltage of which is applied between the cathode and the control electrode of said switching element;

said predetermined value for conduction of said switching element being variable in response to said counter electromotive force to delay the conduction angle of the semiconductor element for an increased counter electromotive force and to advance the conduction angle of the semiconductor element for a decreased counter electromotive force.

2. A DC motor speed control system according to claim 1, wherein said switching element having a control electrode is a programmable unijunction transistor, said counter electromotive detecting means has a second constant voltage element which is connected in parallel with said motor, and said first constant voltage element and said second constant voltage element are connected in series with each other and are connected between the cathode electrode and the control electrode of said programmable unijunction transistor.

3. A DC motor speed control system according to claim 2, wherein said first and second constant voltage elements are first and second Zener diodes respectively, and said semoconductor element having a control electrode is a thyristor, the cathode of said first Zener diode being connected with the anode of said thyristor, said anode being connected with the cathode of said second Zener diode and the cathode of said thyristor, and the anode of said second Zener diode being connected with the cathode of said programmable unijunction transistor.

4. A DC motor speed control system according to claim 3, wherein the cathode of said programmable unijunction transistor is connected with the gate of said thyristor, a first resistor is connected between the cathode and the gate of said thyristor, and said counter electromotive force detecting means has a second resistor; said second resistor and said second Zener diode being connected in series with each other and in parallel with said motor, the cathode of said programmable unijunction transistor being connected to the junction point of said second resistor and the anode of said second Zener diode, and the values of said first and second resistors being adjusted, respectively, so that the voltage drop across said second Zener diode caused by the conduction current of said thyristor is zero.

5. A DC motor speed control system according to claim 4, wherein said charging circuit comprises a capacitor which is connected between the anode of said programmable unijunction transistor and the cathode of said thyristor.

* * * * *